US008161255B2

(12) United States Patent
Anglin et al.

(10) Patent No.: US 8,161,255 B2
(45) Date of Patent: Apr. 17, 2012

(54) OPTIMIZED SIMULTANEOUS STORING OF DATA INTO DEDUPLICATED AND NON-DEDUPLICATED STORAGE POOLS

(75) Inventors: Matthew J. Anglin, Tucson, AZ (US); David M. Cannon, Tucson, AZ (US); Howard N. Martin, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 12/349,318

(22) Filed: Jan. 6, 2009

(65) Prior Publication Data
US 2010/0174881 A1 Jul. 8, 2010

(51) Int. Cl.
*G06F 12/00* (2006.01)
*G06F 13/00* (2006.01)
*G06F 13/28* (2006.01)

(52) U.S. Cl. ........ 711/162; 711/154; 711/161; 711/170; 711/E12.001; 707/999.006; 707/999.101; 707/999.204

(58) Field of Classification Search .................. 711/154, 711/161, 162, 170, E12.001; 707/999.006, 707/999.101, 999.204
See application file for complete search history.

(56) References Cited

U.S. PATENT DOCUMENTS

| 5,479,654 | A | 12/1995 | Squibb |
| 5,990,810 | A * | 11/1999 | Williams ........................ 341/51 |
| 6,513,051 | B1 | 1/2003 | Bolosky et al. |
| 6,523,019 | B1 | 2/2003 | Borthwick |
| 6,889,297 | B2 | 5/2005 | Krapp et al. |
| 6,934,714 | B2 | 8/2005 | Menig |
| 7,043,727 | B2 | 5/2006 | Bennett et al. |
| 7,065,619 | B1 | 6/2006 | Zhu et al. |
| 7,092,956 | B2 * | 8/2006 | Ruediger ...................... 707/602 |
| 7,116,249 | B2 | 10/2006 | McCanne et al. |
| 7,143,091 | B2 | 11/2006 | Charnock et al. |

(Continued)

FOREIGN PATENT DOCUMENTS
WO 2007042954 4/2007

OTHER PUBLICATIONS

Andritsos, Periklis et al., Information-Theoretic Tools for Mining Database Structure from Large Data Sets, Jun. 13-18, 2004.

(Continued)

*Primary Examiner* — Michael Alsip
(74) *Attorney, Agent, or Firm* — Kunzler Needham Massey & Thorpe

(57) ABSTRACT

One aspect of the present invention includes an optimized simultaneous storage operation for data objects onto a combination of deduplicated and non-deduplicated storage pools. In one embodiment, a data object is provided for storage onto destination storage pools in a storage management system, and placed into a source buffer. The data object is first divided into data chunks if the data object has not previously been chunked within the storage management system. The data object is then simultaneously copied from the source buffer to each destination storage pool (deduplicating and non-deduplicating) with the following operation. If the destination pool utilizes deduplication, then the individual data chunks are only transferred if copies of the individual data chunks do not already exist on the destination storage pool. If the destination pool does not utilize deduplication, then all chunks of the data object are transferred to the destination storage pool.

15 Claims, 3 Drawing Sheets

U.S. PATENT DOCUMENTS

| | | | |
|---|---|---|---|
| 7,200,604 B2* | 4/2007 | Forman et al. | 707/692 |
| 7,254,596 B2 | 8/2007 | De Spiegeleer | |
| 7,356,730 B2 | 4/2008 | Ulrich et al. | |
| 7,584,338 B1 | 9/2009 | Bricker et al. | |
| 7,814,149 B1 | 10/2010 | Stringham | |
| 7,822,939 B1 | 10/2010 | Veprinsky et al. | |
| 2002/0107877 A1* | 8/2002 | Whiting et al. | 707/204 |
| 2002/0116402 A1 | 8/2002 | Luke | |
| 2005/0268068 A1 | 12/2005 | Ignatius et al. | |
| 2006/0036901 A1 | 2/2006 | Yang et al. | |
| 2006/0224846 A1 | 10/2006 | Amarendran et al. | |
| 2006/0230244 A1 | 10/2006 | Amarendran et al. | |
| 2007/0208788 A1 | 9/2007 | Chakravarty et al. | |
| 2008/0005141 A1 | 1/2008 | Zheng et al. | |
| 2008/0005201 A1 | 1/2008 | Ting et al. | |
| 2008/0294660 A1 | 11/2008 | Patterson et al. | |
| 2008/0294696 A1* | 11/2008 | Frandzel | 707/200 |
| 2009/0204636 A1 | 8/2009 | Li et al. | |
| 2009/0204649 A1 | 8/2009 | Wong et al. | |
| 2009/0204652 A1 | 8/2009 | Chikusa et al. | |
| 2009/0271402 A1 | 10/2009 | Srinivasan et al. | |
| 2010/0042790 A1* | 2/2010 | Mondal et al. | 711/161 |
| 2010/0042804 A1 | 2/2010 | Ignatius et al. | |

OTHER PUBLICATIONS

Conrad, Jack G., et al, Online Duplicate Document Detection: Signature Reliability in a Dynamic Retrieval Environment, Nov. 3-8, 2003.

Getoor, Lise et al, Link Mining: A Survey, vol. 7, Issue 2, Dec. 2005.

McCallum, Andrew, Extraction: Distilling Structured Data from Unstructured Text, University of Massachusetts, Nov. 2005.

Noren, G. Niklas, et al., A Hit-Miss Model for Duplicated Detection in the WHO Drug Safety Database, Aug. 2005.

Office Action received from USPTO, U.S. Appl. No. 12/243,743, Received Sep. 7, 2011.

* cited by examiner

OPTIMIZED SIMULTANEOUS STORING OF DATA INTO DEDUPLICATED AND NON-DEDUPLICATED STORAGE POOLS

FIELD OF THE INVENTION

The present invention generally relates to data storage and retrieval operations within a data storage system. The present invention more specifically relates to optimizing the simultaneous storing of deduplicated data among multiple pools of a storage-management system that provides a repository for computer information that is backed up, archived, or migrated from client nodes in a computer network.

BACKGROUND OF THE INVENTION

In a typical storage management system, administrators are able to configure storage pools, each storage pool being a collection (a group) of the same device used for storing end-user data. These storage pools are used as targets for store operations from a client and are referenced in server policies and other constructs for processing. When storing data on behalf of a client, the storage management system has the ability to simultaneously store data to more than one storage pool. One, and only one, of the pools are configured as a primary storage pool where the 'master' copy of the data is kept. Other storage pools may include copy storage pools that are used to recover data in the primary pools, and active-data pools where only active versions of backup data are stored for rapid recovery of client machines. Writing simultaneously to multiple pools during client backup reduces the window needed for back-end processes to copy data from the primary pools to either the copy or active-data pools.

One method of accomplishing this simultaneous write operation is through use of a session thread that is started to receive data from the client. Separate transfer threads (one per storage pool) are also started and are responsible for writing the data to the storage media. As the session thread receives the data, it places it into a transfer buffer. Once the buffer is full, the session thread signals the transfer threads that there is work to do. Each transfer thread takes the transfer buffer and writes the data to the storage media. It is important to note that the transfer threads are able to read from the buffer at the same moment. Once all transfer threads have finished writing the buffer's data, they signal to the session thread that they are ready for another buffer. The session thread then passes the next buffer to the transfer threads, and this process repeats until all data has been written to the media in all pools.

Various storage management systems now use storage pools which are enhanced by the use of data deduplication, whereby the redundant storage of common data is greatly reduced. In a typical deduplication configuration, a disk-based storage system, such as a storage-management server or virtual tape library, has the capability to detect redundant data "extents" (also known as data "chunks") and reduce data duplication by avoiding the redundant storage of such extents. If a redundant chunk is identified, that chunk can be replaced with a pointer to the matching chunk. These storage pools are referred to as deduplication pools. Primary, copy, and active-data pools can all be implemented as deduplication pools.

There may be significant advantages to creating a non-deduplicated copy of data in lower-cost storage that will be deduplicated in a primary storage pool. Maintaining such copies can mitigate the risk of data loss related to deduplication in the primary data store; these risks include the potential for false chunk matches, media failure, and logic errors. However, copying data imposes additional demands on the storage management system in addition to the time-consuming and resource-intensive deduplication operations to identify and remove duplicate data. Consequently, available time windows may not be sufficient to allow completion of operations to copy and deduplicate data. What is needed is an efficient operation for copying data in non-deduplicated form during a data transfer in which deduplicated data is stored or moved.

BRIEF SUMMARY OF THE INVENTION

One aspect of the present invention includes an optimized operation to enable the simultaneous transfer of non-deduplicated data to one or more destination pools with the transfer of corresponding deduplicated data to one or more different destination storage pools. This operation is configured to handle the possibility that different deduplication pools may not share the same set of common chunks, with the result that different chunks may need to be copied to each of these deduplication pools. This optimized operation can be applied in various data-transfer scenarios, including a simultaneous write to one or more copy pools (including a mixture of deduplicated and non-deduplicated pools) during storage management system operations such as an inline data ingest; migration of data from a deduplicated pool; and migration of data from a non-deduplicated pool.

In one embodiment of the present invention, the operation for performing an efficient simultaneous storage of data is implemented by using a common source buffer containing non-deduplicated file data. During ingestion of data into the storage management system, the source buffer would contain a stream of data sent by a client. During migration of non-deduplicated data, the source buffer would contain data that is read from the source storage pool. During migration of deduplicated data, the source buffer would contain data that is read and reassembled from all chunks of the data object in the source deduplicating pool.

In a further embodiment, an operation for performing the simultaneous storage of data onto a plurality of deduplicated and non-deduplicated storage pools may be applied to a data object which is provided to (i.e., ingested or migrated within) the storage management system for storage onto one or more of its destination storage pools. The data object to be stored is first placed into a source buffer, and is divided into a set of data chunks if the data object has not been previously divided into chunks. In a further embodiment, the operation to divide the data object into chunks occurs within a temporary scanning buffer. Additionally, in a further embodiment, the data object may be divided using a Rabin fingerprinting algorithm. In still a further embodiment, a Secure Hash Algorithm digest is generated for each chunk for use with data chunk deduplication.

The process of copying the data object to each destination storage pool is then performed by copying each data chunk of the data object, after determining if the target (i.e., destination) pool of the data object employs deduplication. If the target pool of the data object is a not a deduplicating storage pool, then each chunk of the data object will be copied from the source buffer to the target pool. If the target pool of the data object is a deduplicating storage pool, then data chunks are copied to the target pool only if necessary. This includes determining if each individual data chunk exists within the target pool, and transferring the data chunks of the data object that are not existent within the target storage pool. In one embodiment, if the target pool employs deduplication, any transferred data chunks (which did not previously exist within the target storage pool) are set as a base chunk within the deduplicating storage pool. In another embodiment, the data chunk is catalogued to point to a target chunk in the target pool if the target pool is a deduplicating storage pool and the data chunk already existed in the target pool.

DETAILED DESCRIPTION OF THE INVENTION

One aspect of the present invention includes optimizing the simultaneous storage and transfer of data within a storage management system that employs deduplication. This enables a data ingestion, storage, or other file transfer operation to be performed efficiently with multiple threads to storage pools that contain different sets of deduplicated data.

A further aspect of the present invention includes an operation that prevents the unnecessary division and rehashing of files that have already been deduplicated. This operation is also able to prevent the unnecessary transfer of data chunks to a deduplicated target pool if the chunks already exist on the target pool. Accordingly, the processing optimization leveraged by the present invention is maximized when transferring data between storage pools which employ deduplication.

Deduplication generally refers to the elimination of redundant subfiles from data objects, these subfiles generally referred to as blocks, chunks, or extents. The deduplication process is usually applied to a large collection of files in a shared data store, and its successful operation greatly reduces the redundant storage of common data. Further, the advantages of data deduplication include requiring reduced storage capacity for a given amount of data; providing the ability to store significantly more data on a given amount of disk; and improving the ability to meet recovery time objective (RTO) when restoring from disk rather than tape.

A typically configured storage system such as a storage-management server or virtual tape library performs deduplication by detecting redundant data chunks within its data objects and preventing the redundant storage of such chunks. For example, the deduplicating storage system could divide file A into chunks a-h, detect that chunks b and e are redundant, and store the redundant chunks only once. The redundancy could occur within file A or with other files stored in the storage system. Deduplication can be performed as objects are ingested by the storage manager (in-band) or after ingestion (out-of-band).

Known techniques exist for deduplicating data objects. Typically, the object is divided into chunks using a method such as Rabin fingerprinting. Redundant chunks are detected using a hash function such as MD5 or SHA-1 to produce a hash value for each chunk, and this hash value is compared against values for chunks already stored on the system. The hash values for stored chunks are typically maintained in an index. If a redundant chunk is identified, that chunk can be replaced with a pointer to the matching chunk.

Figure 1:
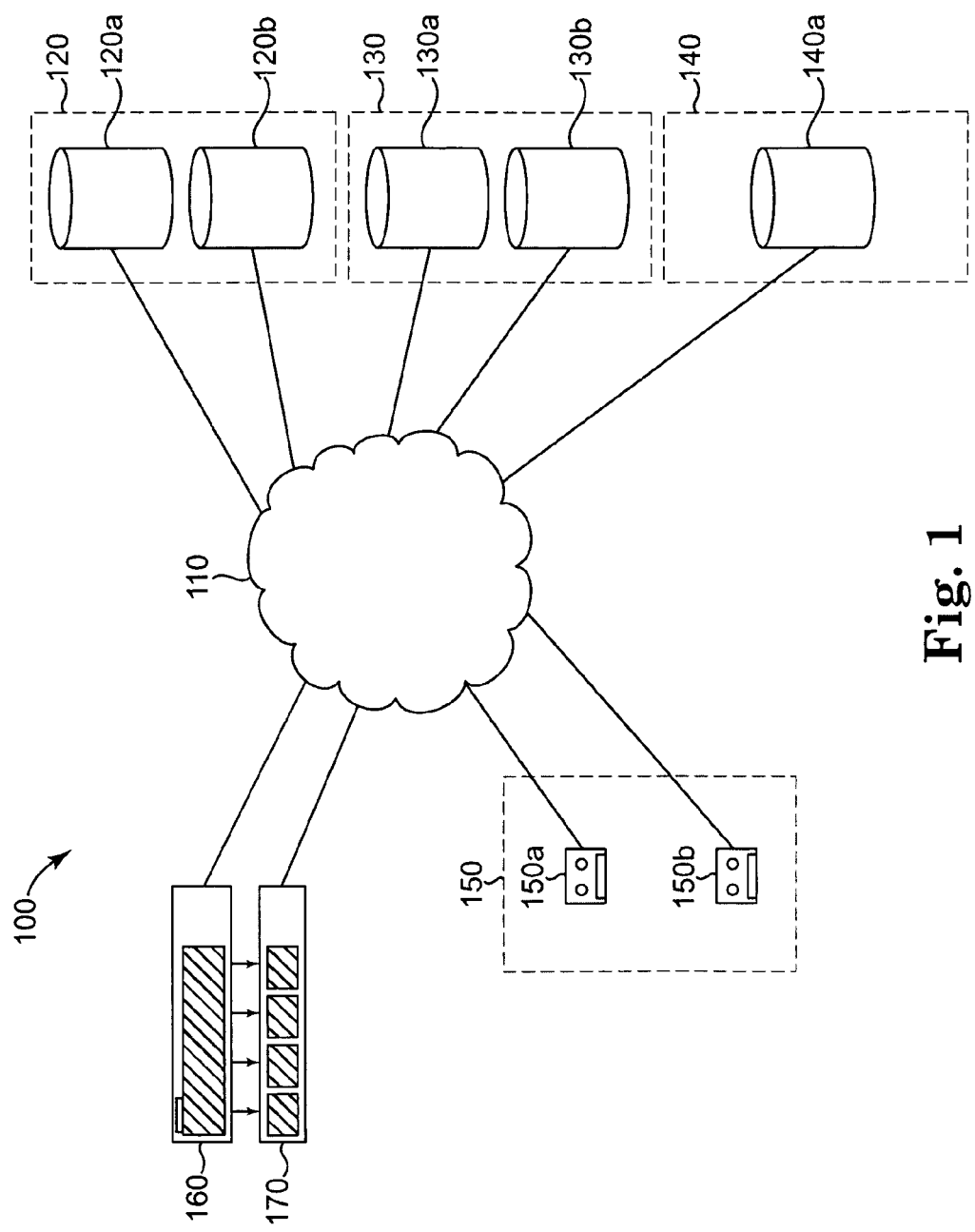
FIG. 1 illustrates an example environment used to implement an optimized operation for a simultaneous storage of data onto multiple storage pools in accordance with one embodiment of the present invention.

An example environment performing deduplication within one embodiment of the present invention is depicted in FIG. 1, which demonstrates a storage management system 100 operating over a network 110. The storage management system 100 includes a number of storage pools 120, 130, 140 connected over the network 110 where data is stored during its normal operation within the storage management system. For example, storage pool 140 could serve as a primary storage pool, and storage pools 120-130 could serve as active-data pools to support the active backup of data. As depicted, these storage pools include storage disks 120a, 120b, 130a, 130b, and 140a. Further, the storage management system 100 in FIG. 1 includes a "copy pool" storage pool 150 that contains tape backup systems 150a and 150b which record a backup copy of data on low-cost media. The copy pool, however, may also be implemented by other suitable backup means.

The storage management system 100 further includes a common source buffer 160 that is used for various data transfer scenarios, such as data ingestion, and migration of data from either of a deduplicated pool or a non-deduplicated pool. Additionally, the storage management system contains a temporary scanning buffer 170 which is used as necessary to divide non-deduplicated data objects into chunks and obtain the digest of these chunks in preparation of the transfer of data chunks between storage pools.

Figure 2:
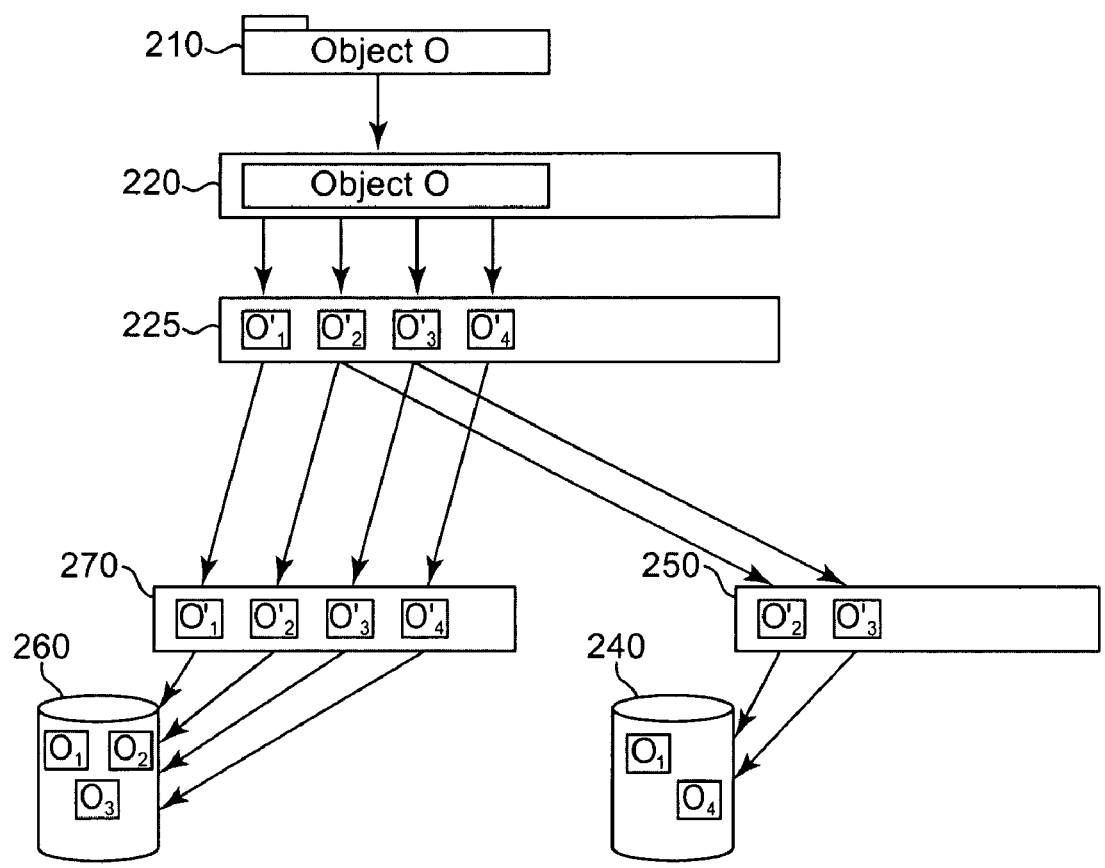
FIG. 2 illustrates an example storage management system performing an optimized operation for a simultaneous storage of data onto multiple storage pools in accordance with one embodiment of the present invention.

FIG. 2 depicts an illustration of an example storage management system performing a simultaneous storage of data chunks onto multiple storage pools in accordance with one embodiment of the present invention. First, data is examined in a source buffer 220 containing the data from a data object O 210, whether or not the data object is obtained from a deduplicating source. The amount of data in the buffer is dependent on the size of the buffer—typically only a portion of the data object will be copied to the buffer and examined at one time. Accordingly, during ingestion of data into the storage management system, the source buffer 220 contains a stream of data sent by a client. During migration of data that is retrieved from a non-deduplicated source pool, the source buffer 220 would contain data that is read from the source storage pool. During migration of deduplicated data, the source buffer 220 would contain data that is read and reassembled from chunks in the source deduplicating pool.

If the data in the source buffer 220 has already been deduplicated within the storage management system, then the division and indexing of the chunks has already been performed and re-performance of these activities is not necessary. However, if the data object in the source buffer 220 has not been deduplicated, the data is divided into extents or chunks as part of the "chunking" process used to perform deduplication. The chunking process is performed within a temporary scanning buffer 225 using a well-known algorithm such as Rabin fingerprinting. The temporary scanning buffer 225 in FIG. 2 illustrates the result of chunking of the object O 210, producing chunks $O'_1$-$O'_4$ (which are identical copies of chunks $O_1$-$O_4$ that are stored throughout the storage management system). Additionally, a digest is generated for each chunk, using an algorithm such as Secure Hash Algorithm (SHA-1, SHA-256, SHA-512, etc).

For each target deduplicating pool, depicted in FIG. 2 as storage pool 240, the operation determines whether each chunk is already stored in the target pool by looking for chunks of the same size and digest. If data must be compressed and/or control information must be embedded, the data transformations are performed as the data is copied to a target buffer 250 used with the deduplicating pool 240. Finally, the data chunks are transferred as necessary to each destination output stream on the target deduplicating storage pool 240. As illustrated, only chunks $O'_2$ and $O'_3$ are transferred to the deduplicating pool 240, as chunks $O_1$ and $O_4$ already exist within the pool.

For each target pool that is non-deduplicating, depicted in FIG. 2 as storage pool 260, then all of the data chunks in their entirety are simply copied to the respective target non-deduplicating pool using the target buffer 270 for the non-deduplicating pool 260. As illustrated, chunks $O'_1$-$O'_4$ will be copied to non-deduplicating pool 260 even though existing copies of chunks $O_1$-$O_3$ already exist within the pool.

Figure 3:
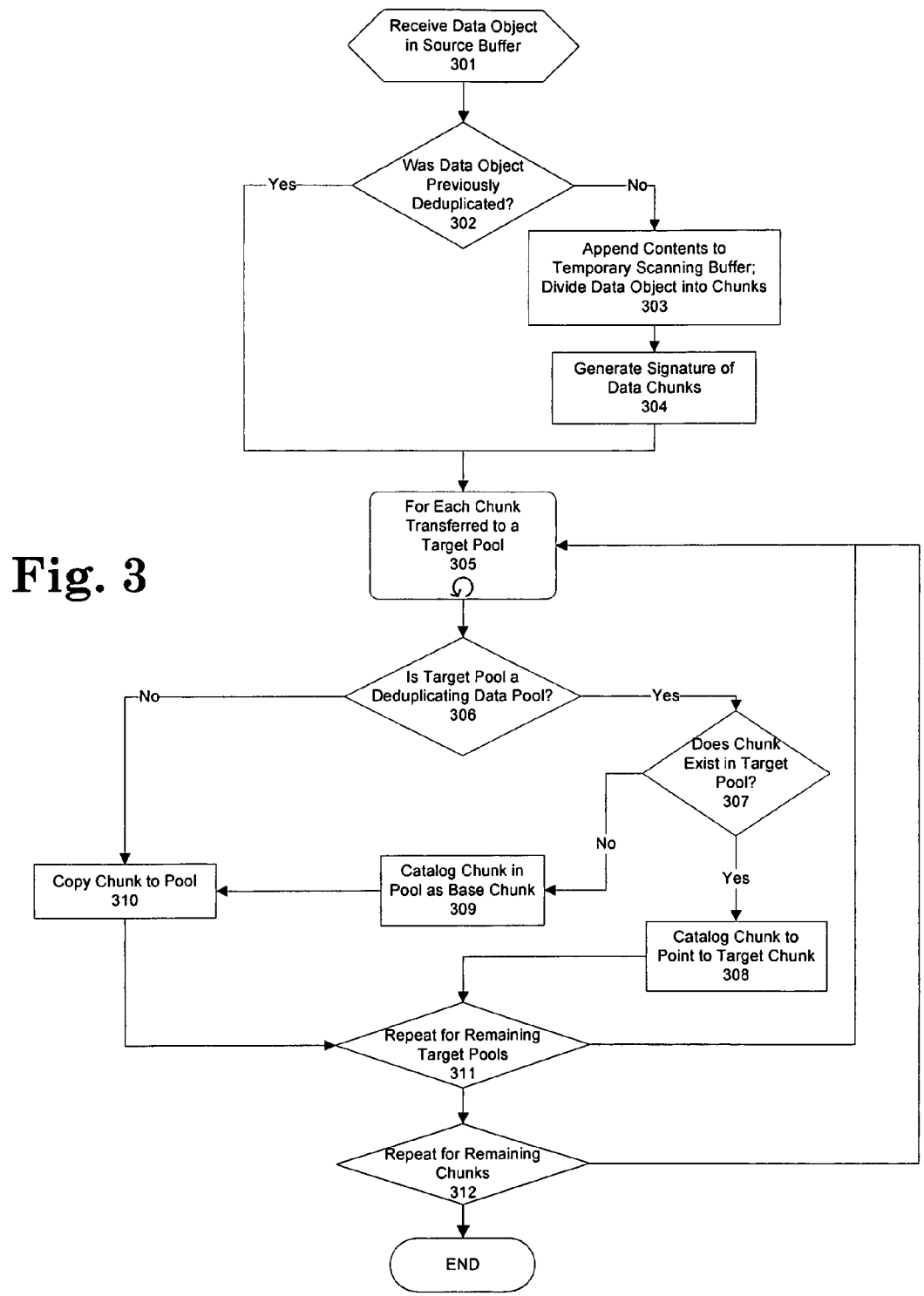
FIG. 3 illustrates a flowchart representative of an example optimized operation for the simultaneous storage of data chunks onto multiple storage pools in accordance with one embodiment of the present invention.

FIG. 3 depicts a flowchart of an operation for performing the optimized simultaneous storage of data chunks onto multiple storage pools in accordance with a further embodiment of the present invention. As data feeds in from its source, a data object is received into a source buffer as in step 301. Again, this may occur as part of a data ingestion into the storage management system, or the transfer of a data object from either a deduplicated or a non-deduplicated source.

Next, the signatures of the chunks of the data object are obtained in preparation of the storage of the data object to the one or more destination storage pools. If the data object has been previously deduplicated per step 302, then the data object has already been divided and indexed, and any relevant deduplication information is already available for the data object's chunks. Thus, because all of the chunks of the data object have been previously identified, the process is simplified by not having to use another buffer to look for the fingerprints and generate the signature of the chunks.

However, per step 302, if the data object being received has not been previously deduplicated (such as data being received from a client during data ingestion or being transferred from a non-deduplicated storage pool), then the data object needs to be divided into chunks and indexed. First, for each buffer received from the non-deduplicated data source, buffer contents are appended to the temporary scanning buffer as in step 303. The temporary scanning buffer is allocated to be large enough to hold the maximum chunk size. The temporary scanning buffer is needed because chunks may be of variable size and it may be necessary to perform multiple reads to get the entire chunk.

Additionally in step 303, the data is split into chunks using a method such as Rabin fingerprinting. In one embodiment, this is performed by locating a fingerprint in the temporary scanning buffer to identify the chunk boundary. If a fingerprint is not found, and if this is not the last buffer, then return and wait for more data. Otherwise, the end of the buffer is marked as a chunk boundary. The appropriate indexing algorithm then computes a digest for the chunk as in step 304. In one embodiment, a signature is computed against the chunk using a SHA algorithm as determined by end of file or fingerprint.

Next, it is determined what to do with each data chunk of the data object as the data chunks are prepared for transfer to each target pool as in step 305. This includes determining how many unique destination streams are required to transfer the data chunks to the various destination storage pools. If there is no sharing of common chunks across pools, each deduplicating destination pool will use its own stream—this is because it is not known whether a chunk must be transferred until the entire chunk has been processed. Alternatively, if the system allows sharing of common chunks across pools, a single output stream can be used for all destination deduplicating pools.

Additionally, destination pools which are non-deduplicating may share a single target stream, since they will be processing the entire contents of the input stream. For each destination stream that transfers the data to a destination pool, the processing is dependent on whether the stream is associated with a deduplicating target pool as queried in step 306.

If the destination is a deduplicating target pool, then each data chunk of the data object is analyzed to determine if the various chunks of the data object already exist in the target pool as in step 307. Thus, for each chunk, this process includes looking in the destination pool's chunk listing to see if the various chunks of the data object with the same size and signature exist in the pool. If a chunk exists in target pool, the chunk is cataloged to point to the target chunk as in step 308, but the chunk is not copied to the stream for the target pool. If it is determined that the data chunk does not exist in target pool as in step 307, then the chunk is cataloged as a base chunk in target pool as in step 309, and the chunk is copied to the target pool stream as in step 310.

If the destination is not a deduplicating target pool as in step 306, then the chunk is simply copied to the destination storage pool as in step 310. Additionally, if the source stream of the data chunk is a deduplicating pool, the chunk to copy may actually be stored in a different object or storage pool. As part of copying the chunk to the target pool, the source link is followed to find the actual data to copy. However, the actual data associated with the chunk is eventually copied.

The process described within steps 306-310 is then repeated for the transfer of the data chunk to any additional destination pools as in step 311. As suggested above, the storage management system may be configured to simultaneously transfer a data chunk to multiple pools, rather than transferring data to multiple pools in a sequential loop. Finally, the process described within steps 306-310 is repeated for any remaining chunks of the data object as in step 312.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for optimizing the simultaneous storage of data into deduplicated and non-deduplicated storage pools, comprising:
    placing a data object into a source buffer;
    copying the data object to a temporary buffer if the data object has not been previously divided into data chunks;
    dividing the data object within the temporary buffer into data chunks if the data object has not been previously divided into data chunks;
    copying a data chunk into a target buffer for a deduplicated destination storage pool if a copy of the data chunk does not exist within the deduplicated destination storage pool and copying the data chunk into a target buffer for a non-deduplicated destination storage pool, wherein control data is embedded in the data chunk and the data chunk is compressed during the copy;
    copying the data chunk in the target buffer for the deduplicated destination storage pool to the deduplicated destination storage pool;
    copying the data chunk in the target buffer for the non-deduplicated destination storage pool to the non-deduplicated destination storage pool; and
    repeating the copying for each data chunk of the data chunks.

2. The method of claim 1, wherein the data object is divided into data chunks using a Rabin fingerprinting algorithm.

3. The method of claim 1, wherein a Secure Hash Algorithm digest is generated for each data chunk.

4. The method of claim 1, further comprising cataloging the data chunk in the destination storage pool as a base chunk responsive to determining the destination storage pool is a deduplicating storage pool and a copy of the data chunk does not exist in the destination storage pool.

5. The method of claim 1, further comprising cataloging the data chunk to point to a copy of the data chunk in the destination storage pool responsive to determining the destination storage pool is a deduplicating storage pool and a copy of the data chunk exists in the destination storage pool.

6. A system, comprising:
    at least one processor; and
    at least one memory storing instructions operable with the at least one processor for optimizing the simultaneous storage of data into deduplicated and non-deduplicated storage pools, the instructions being executed for:
        placing a data object into a source buffer;
        copying the data object to a temporary buffer if the data object has not been previously divided into data chunks;
        dividing the data object within the temporary buffer into data chunks if the data object has not been previously divided into data chunks;
        copying a data chunk into a target buffer for a deduplicated destination storage pool if a copy of the data chunk does not exist within the deduplicated destination storage pool and copying the data chunk into a target buffer for a non-deduplicated destination storage pool, wherein control data is embedded in the data chunk and the data chunk is compressed during the copy;
        copying the data chunk in the target buffer for the deduplicated destination storage pool to the deduplicated destination storage pool; and
        copying the data chunk in the target buffer for the non-deduplicated destination storage pool to the non-deduplicated destination storage pool; and
        repeating the copying for each data chunk of the data chunks.

7. The system of claim 6, wherein the data object is divided into data chunks using a Rabin fingerprinting algorithm.

8. The system of claim 6, wherein a Secure Hash Algorithm digest is generated for each data chunk.

9. The system of claim 6, further comprising cataloging the data chunk in the destination storage pool as a base chunk responsive to determining the destination storage pool is a deduplicating storage pool and a copy of the data chunk does not exist in the destination storage pool.

10. The system of claim 6, further comprising cataloging the data chunk to point to a copy of the data chunk in the destination storage pool responsive to determining the destination storage pool is a deduplicating storage pool and a copy of the data chunk exists in the destination storage pool.

11. A computer program product comprising a tangible computer readable storage medium storing a computer readable program for optimizing the simultaneous storage of data into deduplicated and non-deduplicated storage pools, wherein the computer readable program when executed on a computer causes the computer to:
    place a data object into a source buffer;
    copying the data object to a temporary buffer if the data object has not been previously divided into data chunks;
    divide the data object within the temporary buffer into data chunks if the data object has not been previously divided into data chunks;
    copying a data chunk into a target buffer for a deduplicated destination storage pool if a copy of the data chunk does not exist within the deduplicated destination storage pool and copying the data chunk into a target buffer for a non-deduplicated destination storage pool, wherein control data is embedded in the data chunk and the data chunk is compressed during the copy;
    copying the data chunk in the target buffer for the deduplicated destination storage pool to the deduplicated destination storage pool; and
    copying the data chunk in the target buffer for the non-deduplicated destination storage pool to the non-deduplicated destination storage pool; and
    repeating the copying for each data chunk of the data chunks.

12. The computer program product of claim 10, wherein the data object is divided into data chunks using a Rabin fingerprinting algorithm.

13. The computer program product of claim 11, wherein a Secure Hash Algorithm digest is generated for each data chunk.

14. The computer program product of claim 11, further comprising cataloging the data chunk to point to a copy of the data chunk in the destination storage pool responsive to determining the destination storage pool is a deduplicating storage pool and a copy of the data chunk exists in the destination storage pool.

15. The computer program product of claim 11, further comprising cataloging the data chunk to point to a copy of the data chunk in the destination storage pool responsive to determining the destination storage pool is a deduplicating storage pool and a copy of the data chunk exists in the destination storage pool.

\* \* \* \* \*